US010298283B2

(12) United States Patent
Chou

(10) Patent No.: US 10,298,283 B2
(45) Date of Patent: May 21, 2019

(54) PROTECTIVE CASE

(71) Applicant: X-FACTOR TAIWAN CORPORATION, Taipei (TW)

(72) Inventor: Chin-Hung Chou, Taipei (TW)

(73) Assignee: X-FACTOR TAIWAN CORPORATION, Taipei (TW)

( * ) Notice: Subject to any disclaimer, the term of this patent is extended or adjusted under 35 U.S.C. 154(b) by 0 days.

(21) Appl. No.: 15/446,766

(22) Filed: Mar. 1, 2017

(65) Prior Publication Data

US 2018/0019779 A1 Jan. 18, 2018

(30) Foreign Application Priority Data

Jul. 13, 2016 (TW) .............................. 105210544 U

(51) Int. Cl.
| | |
|---|---|
| *C25D 11/04* | (2006.01) |
| *C25D 11/30* | (2006.01) |
| *C25D 5/20* | (2006.01) |
| *C25D 5/18* | (2006.01) |
| *H04B 1/3888* | (2015.01) |
| *C25D 11/02* | (2006.01) |
| *A45C 11/00* | (2006.01) |
| *A45C 13/00* | (2006.01) |
| *A45F 5/00* | (2006.01) |

(52) U.S. Cl.
CPC ............ *H04B 1/3888* (2013.01); *A45C 11/00* (2013.01); *A45C 13/002* (2013.01); *A45F 5/00* (2013.01); *C25D 11/024* (2013.01); *C25D 11/026* (2013.01); *C25D 11/04* (2013.01); *C25D 11/30* (2013.01); *A45C 2011/002* (2013.01)

(58) Field of Classification Search
CPC .................................................. C25D 11/026
See application file for complete search history.

(56) References Cited

U.S. PATENT DOCUMENTS

| 6,365,028 | B1 | 4/2002 | Shatrov | |
|---|---|---|---|---|
| 6,896,785 | B2 | 5/2005 | Shatrov et al. | |
| 2009/0041988 | A1* | 2/2009 | Ho ......................... | C25D 11/04 428/172 |
| 2013/0221816 | A1* | 8/2013 | Liou ....................... | H05K 5/02 312/223.1 |
| 2014/0254072 | A1* | 9/2014 | Zhang ..................... | H05K 5/02 361/679.01 |

(Continued)

*Primary Examiner* — Brian W Cohen
(74) *Attorney, Agent, or Firm* — Lynette Wylie; Apex Juris, pllc.

(57) ABSTRACT

A protective case adapted to be mounted on an electronic device is provided, wherein the electronic device is adapted to perform wireless signal transmission, and has a front surface for usage. The protective case is adapted to surround a periphery of the front surface, and has a frame which surrounds the periphery of the front surface when the protective case is mounted on the electronic device. The protective case includes a core material and a plated coating. The core material includes a metal material. The plated coating covers a surface of the core material, and has a thickness between 15 μm and 25 μm. Materials of the plated coating include a metallic oxide and an alloy oxide. Specifically, with the metallic oxide and the alloy oxide, the plated coating separates the core material from the exterior, and therefore provides an anticorrosion function, as well as prevents external interferences.

2 Claims, 2 Drawing Sheets

(56) References Cited

U.S. PATENT DOCUMENTS

2014/0318974 A1* 10/2014 Curran .................. C25D 11/02
                                                                             205/50
2016/0345451 A1* 11/2016 Wu ........................ C25D 13/12

* cited by examiner

PROTECTIVE CASE

BACKGROUND OF THE INVENTION

1. Technical Field

The present invention relates generally to a protective case for preventing wireless signal interference and more particularly to a protective case for electronic devices.

2. Description of Related Art

In order to reduce the wear and collision damage of electronic devices (for example, portable devices such as cell phones, laptops, and smartwatches), the demand for protective cases or protective frames for electronic devices is significantly increased. Particularly, metal protective cases have fine texture and high hardness, providing good appearance and protective function at the same time, and therefore such protective cases gain a significant market share.

For further lowering the weight of a metal protective case, lightweight materials, e.g., magnesium alloys, aluminum alloys, and titanium alloys, are common choices. However, take the lightest material, i.e., magnesium alloys, as an example, its oxidation potential is the lowest, which means the oxidation activity is high. Accordingly, magnesium alloys have poor corrosion resistance and low surface maintainability. In this case, surface treatment is an important issue. Currently, anodization is a commonly-used process for enhancing the corrosion resistance of magnesium alloys, but the processing liquid for the process includes heavy metals, such as chromium and manganese, and hazardous substances like fluoride, which would cause great harm to the environment. Therefore, the method of surface treatment has to be improved.

Additionally, many commercially available metal protective cases for cell phones may remarkably decrease the strength of the received signals due to the electromagnetic shielding, and such defect would greatly reduce the practicality of such a metal protective case. Therefore, how to manufacture a metal protective case which would not affect the received signal strength of the protected electronic device is also an important issue in the industry.

BRIEF SUMMARY OF THE INVENTION

In view of the above, the primary objective of the present invention is to provide a protective case, which has a greater corrosion resistance through a surface treatment with simple steps, wherein the processing liquid used during the process of surface treatment does not contain any heavy metal and hazardous substance. In addition, the protective case can prevent external interferences caused by wireless signals, and thus the signal strength of a protected electronic device would be avoided from being reduced.

The present invention provides a protective case, which is adapted to be mounted on an electronic device, wherein the electronic device is adapted to perform wireless signal transmission, and has a front surface for usage. The protective case is adapted to surround a periphery of the front surface, and has a frame which surrounds the periphery of the front surface when the protective case is mounted on the electronic device. The protective case includes a core material and a plated coating, wherein the core material includes a metal material, and the plated coating covers a surface of the core material, and has a thickness between 15 μm and 25 μm. Materials of the plated coating include a metallic oxide and an alloy oxide.

Whereby, with the metallic oxide and the alloy oxide, the plated coating separates the core material from the exterior, and therefore provides an anticorrosion function, as well as prevents external interferences.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
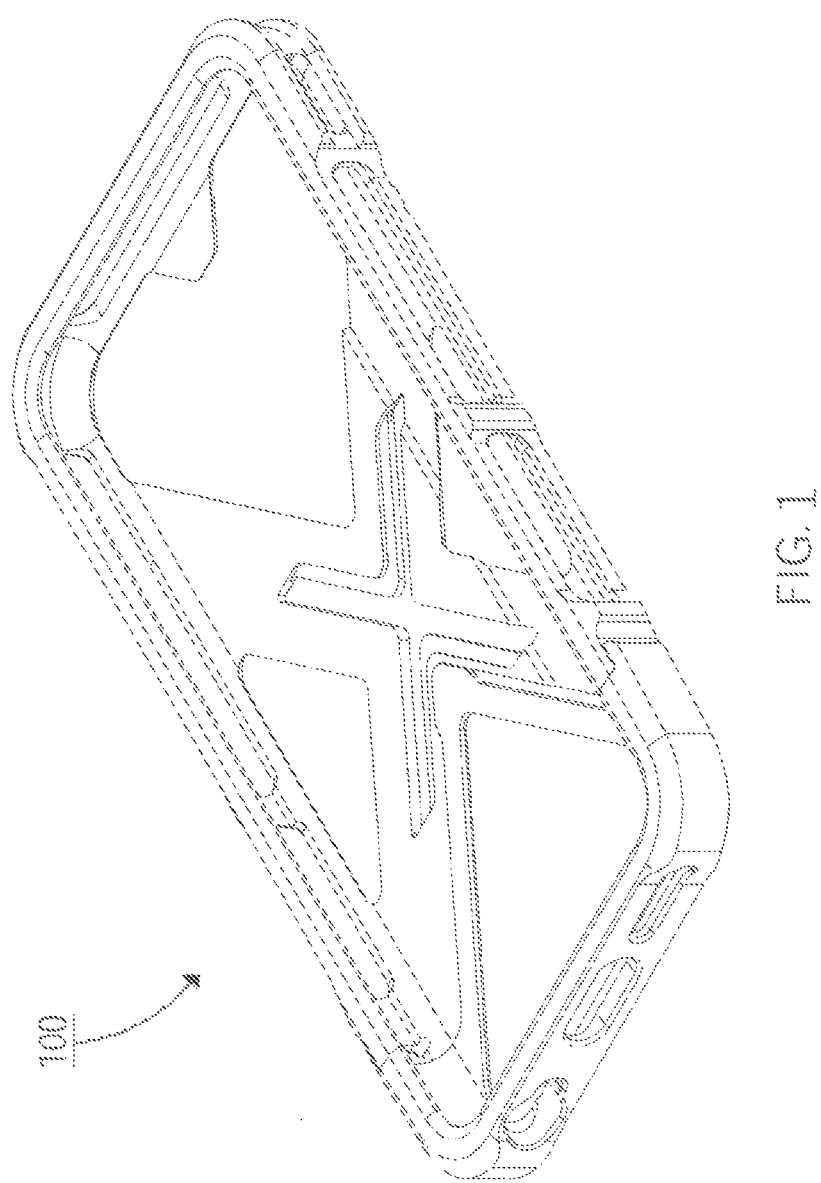
FIG. 1 is a perspective view of a first embodiment of the present invention, showing the protective case.
Figure 2:
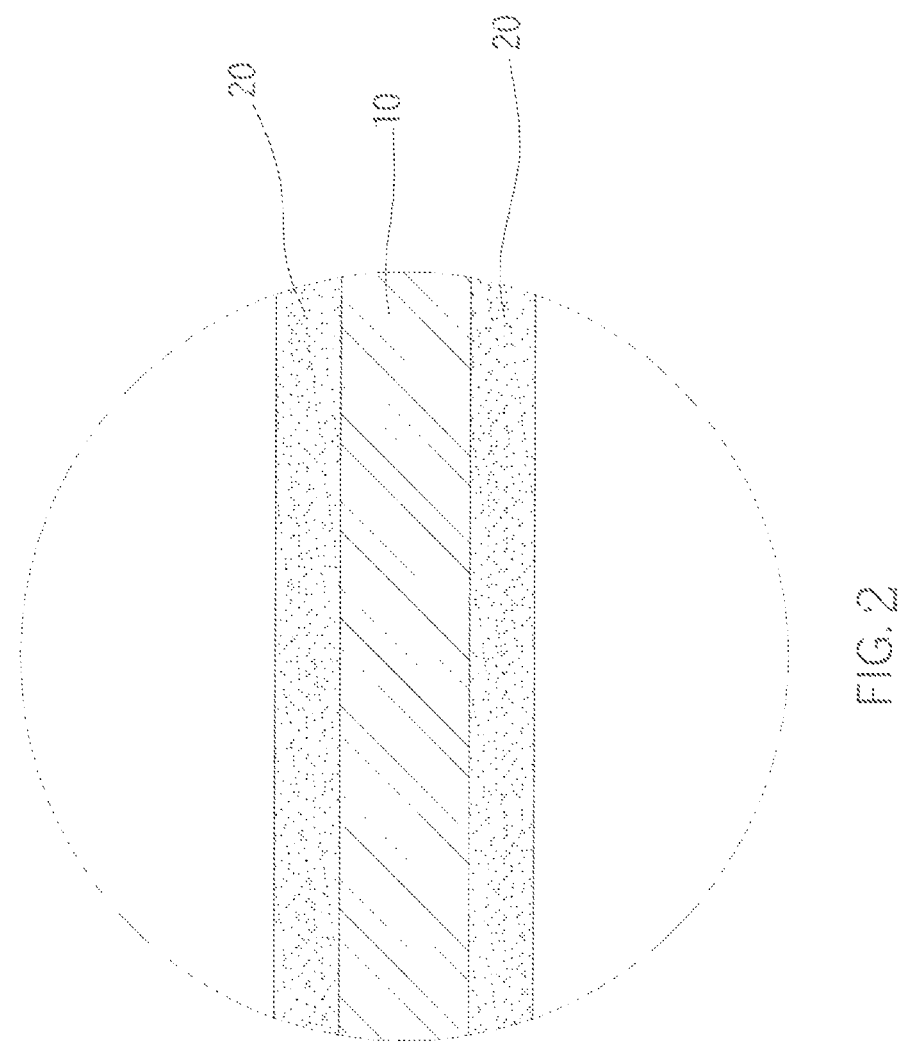
FIG. 2 is a schematic diagram of the first embodiment, showing the plated coating which covers the surface of the core material.

FIG. 1 shows a protective case 100 which is adapted to be mounted on an electronic device (not shown), wherein the electronic device is adapted to perform wireless signal transmission, and has a front surface for usage. The protective case 100 is adapted to surround a periphery of the front surface, and has a frame which surrounds the periphery of the front surface when the protective case is mounted on the electronic device. As shown in FIG. 2, the protective case 100 includes a core material 10 and a plated coating 20 which covers a surface of the core material 10, wherein the core material 10 includes a metal material. In this embodiment, the metal material of the core material 10 is a magnesium alloy. In other embodiments, the core material 10 can be made of other lightweight materials such as aluminum alloys and titanium alloys.

The plated coating 20 is made by Keronite® plasma electrolytic oxidation process, and the detailed method and apparatus are disclosed in U.S. Pat. Nos. 6,365,028 and 6,896,785. The Keronite® plasma electrolytic oxidation process is also known as "surface ceramic modification technology" to modify the surface of the lightweight materials, i.e., magnesium alloys, aluminum alloys, and titanium alloys, to improve their basic properties such as hardness, corrosion resistance, wear resistance, heat resistance, and electrical resistance.

Briefly, the Keronite® plasma electrolytic oxidation process includes the steps below. First, place the core material 10 in an electrolyte which includes at least a metal ion; in this embodiment, the electrolyte includes phosphates, aluminates, and aluminas. In other embodiments, if the core material 10 is made of aluminum alloys, the electrolyte includes phosphates and silicate; if the core material 10 is made of titanium alloys, the electrolyte includes phosphates, borates, and aluminas. That is, the composition of the electrolyte would vary with the material of the core material 10.

Next, supply the electrolyte with bipolar pulses of current to oxidize the surface of the core material 10, wherein the bipolar pulses of current have a regular frequency. Meanwhile, provide acoustic vibrations in the electrolyte, wherein the acoustic vibrations have a regular frequency. The frequency range of the acoustic vibrations overlaps with the frequency range of the bipolar pulses of current. Whereby, the plated coating 20 which includes a metallic oxide and an alloy oxide is formed by electrodeposition. The thickness of the plated coating 20 is between 15 μm and 25 μm, and is preferably 20 μm.

The metals deposited in the electrodeposition process are reduced from the at least a metal ion in the electrolyte. In this embodiment, the metallic oxide of the plated coating 20 is a magnesium oxide (MgO), and the alloy oxide of the plated coating 20 is a magnesium aluminate ($MgAl_2O_4$). In another embodiment, if the core material 10 is made of aluminum alloy, the metallic oxides are aluminas.

Specifically, the plated coating 20 made by the Keronite® plasma electrolytic oxidation process not only makes the protective case 100 be corrosion-resistant, wear-resistant, and insulated, but also prevents the electronic device from external interferences caused by wireless signals. Table 1 shows the total isotropic sensitivity (TIS), i.e., signal strength (dBm), of the smartphone (electronic device) before and after being mounted by the protective case 100, and such result is tested by SGS test. As shown in Table 1, three plated coatings 20 with different thicknesses (15 μm, 20 μm, and 25 μm) are tested.

TABLE 1

| TIS (signal strength (dBm)) of the electronic device | | | |
|---|---|---|---|
| | 15 μm plated coating | 20 μm plated coating | 25 μm plated coating |
| before protective case mounted | | −96.01 | |
| after protective case mounted | −95.93 | −96.13 | −96.17 |
| Difference (%) | 0.08 | 0.12 | 0.17 |

It is known from Table 1 that the signal strength differences between after and before the protective case 100 mounted are all smaller than 0.2%, which means the signal strength of the electronic device is not attenuated. Accordingly, the plated coatings 20 having thickness between 15 μm and 25 μm can prevent external interferences caused by wireless signals. In more details, after mounted by the protective case, the difference of the signal strength of the smartphone keeps within a standard range, and the signal strength maintains normal relative to that before the protective case mounted. However, in order to reduce the cost for commercialization as well as to achieve an anti-interference effect, the preferable thickness of the plated coating 20 of the protective case 100 in this embodiment is 20 μm.

In conclusion, by the Keronite® plasma electrolytic oxidation process with simple steps, the protective case 100 can prevent external interferences caused by wireless signals, and thus the signal strength of the protected electronic device can be avoided from being reduced. In addition, the processing liquid used during the process does not contain any heavy metal and hazardous substance, which reduces environmental damages.

It must be pointed out that the embodiment described above is only a preferred embodiment of the present invention. All equivalent structures which employ the concepts disclosed in this specification and the appended claims should fall within the scope of the present invention.

What is claimed is:

1. A method for making a protective case for an electronic device adaptable for wireless signal transmission, wherein the electronic device includes a front surface for usage; the method comprising the following steps:
    providing the protective case wherein the protective case has a frame which at least surrounds the periphery of the front surface of the electronic device when the protective case is mounted on the electronic device and includes a core material containing a metal;
    placing the core material in an electrolyte including at least one metal ion;
    supplying the electrolyte with bipolar pulses of current to oxidize the surface of the core material; and
    providing acoustic vibrations in the electrolyte, wherein a frequency range of the acoustic vibrations overlaps with a frequency range of the bipolar pulses of current;
    forming a plated coating which includes a metal oxide and an alloy oxide by plasma electrolytic oxidation, wherein the alloy oxide includes a metal atom from the at least one metal ion in the electrolyte; the plated coating covers a surface of the core material, and has a thickness between 15 μm and 25 μm; and
    wherein the plated coating prevents external interferences caused by wireless signals with transmission of the electronic device such that the electronic device without providing the protective case has a first signal strength, and the electronic device mounted within the protective case has a second signal strength, wherein a difference between the first signal strength and the second signal strength is less than 0.2%.

2. The method for making a protective case for an electronic device of claim 1, wherein the metal of the core material is a magnesium alloy; the electrolyte comprises phosphates, aluminates, and aluminas; the metal oxide of the plated coating is a magnesium oxide, and the alloy oxide is a magnesium alloy oxide.

* * * * *